United States Patent
Mo et al.

(10) Patent No.: US 9,515,598 B2
(45) Date of Patent: Dec. 6, 2016

(54) SYSTEM AND METHOD FOR CONTROLLING REGENERATING ENERGY IN AN ADJUSTABLE SPEED DRIVE

(71) Applicant: Eaton Corporation, Cleveland, OH (US)

(72) Inventors: Yaojin Mo, Guangdong (CN); Huaqiang Li, Menomonee Falls, WI (US); Anbo Yu, Guangdong (CN); Dawei Li, Guangdong (CN); Jingfeng Xie, Guangdong (CN)

(73) Assignee: Eaton Corporation, Cleveland, OH (US)

( * ) Notice: Subject to any disclaimer, the term of this patent is extended or adjusted under 35 U.S.C. 154(b) by 58 days.

(21) Appl. No.: 14/672,307

(22) Filed: Mar. 30, 2015

(65) Prior Publication Data

US 2015/0263661 A1    Sep. 17, 2015

Related U.S. Application Data

(63) Continuation of application No. 13/931,121, filed on Jun. 28, 2013, now Pat. No. 8,994,320.

(51) Int. Cl.

| | |
|---|---|
| H02P 27/06 | (2006.01) |
| H02P 23/00 | (2016.01) |
| H02P 27/04 | (2016.01) |
| H02P 21/00 | (2016.01) |

(Continued)

(52) U.S. Cl.
CPC .............. *H02P 27/06* (2013.01); *H02P 3/18* (2013.01); *H02P 21/0021* (2013.01); *H02P 23/00* (2013.01); *H02P 23/20* (2016.02); *H02P 23/28* (2016.02); *H02P 27/047* (2013.01); *H02P 29/0241* (2016.02); *H02M 2007/53876* (2013.01)

(58) Field of Classification Search
CPC ...................................................... H02P 27/06
USPC .................................................. 318/807, 377
See application file for complete search history.

(56) References Cited

U.S. PATENT DOCUMENTS

| | | | |
|---|---|---|---|
| 3,675,099 A | 7/1972 | Johnston | |
| 5,136,494 A | 8/1992 | Akagi et al. | |
| 5,923,728 A * | 7/1999 | Ikkai | B60L 11/1803 318/400.28 |

(Continued)

OTHER PUBLICATIONS

Mirza et al., "Using Regnerative Converter Units to Recover Over Voltage Energy in AC Drive Systems," Hitachi, Pumps & Systems, Nov. 2009, pp. 1-4.

(Continued)

*Primary Examiner* — David S Luo
(74) *Attorney, Agent, or Firm* — Ziolkowski Patent Solutions Group, SC

(57) ABSTRACT

A system and method for controlling an adjustable speed drive (ASD) to decelerate an AC load during a generating mode of operation is disclosed. The ASD includes a capacitor and an inverter coupled to a DC link. A current sensor system is coupled to an output of the inverter. The ASD further includes a control system programmed to calculate an energy of the capacitor, generate a reference power using the calculated capacitor energy, and calculate a feedback power from realtime current signals received from the current sensor system. The control system compares the feedback power to the reference power, defines a frequency offset based on the comparison, generates a speed command using the frequency offset, and outputs the speed command to the inverter to maintain a smooth DC link voltage during deceleration.

20 Claims, 6 Drawing Sheets

(51) Int. Cl.
*H02P 3/18* (2006.01)
*H02M 7/5387* (2007.01)

(56) References Cited

U.S. PATENT DOCUMENTS

| | | |
|---|---|---|
| 5,973,460 A | 10/1999 | Taga et al. |
| 6,768,284 B2 | 7/2004 | Lee et al. |
| 2009/0230903 A1 | 9/2009 | Yamamoto et al. |

2013/0015790 A1  1/2013  Kermarrec et al.

OTHER PUBLICATIONS

Braking/Reneration Manual, Regeneration Overview, Rockwell, Feb. 2001, pp. 1-6, http://www.ab.com/support/abdrives/documentation/techpapers/RegenOverview01.pdf.
Hyman, "Regenerative Braking," Aug. 18, 2011, pp. 1-19.
International Search Report and Written Opinion from PCT Application No. PCT/US2014/043145, dated Dec. 9, 2014.

* cited by examiner

SYSTEM AND METHOD FOR CONTROLLING REGENERATING ENERGY IN AN ADJUSTABLE SPEED DRIVE

CROSS-REFERENCE TO RELATED APPLICATION

The present application is a continuation of and claims priority to U.S. Non-Provisional application Ser. No. 13/931,121, filed Jun. 28, 2013, the disclosure of which is incorporated herein by reference in its entirety.

BACKGROUND OF THE INVENTION

The present invention relates generally to adjustable speed drives and, more particularly, to a system and method for controlling an adjustable speed drive during generating mode of operation during deceleration using a dual loop control architecture.

Motor drives are frequently used in industrial applications to condition power and otherwise control electric driven motors such as those found with pumps, fans, compressors, cranes, paper mills, steel mills, rolling mills, elevators, machine tools, and the like. Motor drives typically provide a volts-per-hertz control and have greatly improved the efficiency and productivity of electric driven motors and applications. Increasingly, motor drives are taking the form of adjustable or variable speed drives (ASD or VSD) or adjustable frequency drives (AFD) that are adept at providing variable speed and/or variable torque control to an electric driven motor or induction machine.

If the stator terminals of an induction machine are connected to a three-phase AFD system, the rotor of the induction machine will rotate in the direction of the stator rotating magnetic field during a motoring mode of operation. When load torque is applied to the motor shaft, the steady state speed remains less than the synchronous speed. However, if the speed of the induction machine is higher than the synchronous speed when the induction machine rotates in the same direction as the stator rotating field, such as during a no load operating condition, the induction machine is in a generating mode of operation. A generating torque acting opposite the stator rotating magnetic field is produced during the generating mode, causing power to flow from the induction machine back in to the AFD.

To stop an AFD system, the AFD applies a lower frequency to the induction machine to attempt to decelerate the motor at a faster rate than if the motor were allowed to coast to a stop. During the deceleration process, the AFD continues to apply energy to the motor windings to keep the magnetic field active. Because the applied frequency is lower than the virtual frequency of the motor, the motor enters the generating mode of operation during which the generating action of the induction machine will cause the power flow to reverse the kinetic energy of the AFD system and feed power back to the power supply source. As energy is transferred from the motor to the DC link of the AFD, the DC link voltage increases and can become unstable.

One known technique for protecting the AFD during the deceleration process monitors the DC link voltage. If the DC link voltage rises above a threshold DC link voltage during deceleration, the AFD will trip and disrupt the normal stopping operation. An illustration of this technique is shown in FIG. 1. Graph 10 shows the experimental waveforms, including drive output frequency 12, DC link voltage 14, and motor current 16, for a 20 hp motor driven by a 40 hp drive from 100 Hz to 0 Hz at no load (i.e., minimum torque) at a 0.1 second deceleration rate. The top portion 18 of graph 10 is illustrated in 1 second divisions and the bottom portion 20 of graph 10 illustrates a subportion of the waveforms in 50 millisecond divisions. As the motor starts to ramp down its speed and the drive output frequency 12 decreases, the motor enters a regenerating condition and the rising DC link voltage 14 causes an overvoltage trip when the DC link voltage exceeds a threshold. After the AFD trips, the motor shuts down in an uncontrolled manner. The unstable DC link voltage and uncontrolled shutdown adds stress on the DC link capacitors, introduces EMC problems, creates undesirable harmonics and resonance, adds mechanical stress, and degrades overall system performance.

Instead of tripping, the switching control of the AFD may cause the DC link voltage to begin oscillating during the deceleration process. As an example, the graph 22 shown in FIG. 2 illustrates the captured waveforms for DC link voltage 24, motor current 26, and drive output frequency 28 for an exemplary 60 hp drive decelerating a 20 hp motor from 100 Hz to 0 Hz at no load. When the deceleration function is selected and the deceleration rate is set as 0.1 seconds, the motor begins ramping down its speed into a regenerating condition. As shown in graph 22, the DC link voltage 24 becomes oscillatory with an overshoot exceeding 150V. That is, at certain frequencies, the voltage will jump between high and low values and disrupt the normal deceleration process, resulting in EMI and EMC interferences with surrounding equipment.

Another known solution for controlling the deceleration process employs a braking resistor, which provides a path to dissipate the regenerative energy. The braking resistor control circuit senses the high DC voltage condition and electrically connects the braking resistors across the DC link. While the braking resistors can be effective in dissipating excess energy, the costs of the braking resistor can be significant. Also, the large physical size of the braking resistor significantly increases the overall size of the AFD.

It would therefore be desirable to provide a system and method for controlling an AFD during a generating mode of operation that maintains a smooth DC link voltage during deceleration without tripping the AFD or generating an oscillation in the DC link voltage. It would further be desirable to provide a system and method for controlling an AFD without a braking resistor to minimize the size and cost of the AFD.

BRIEF DESCRIPTION OF THE INVENTION

Embodiments of the present invention provide a system and method for controlled deceleration of a load during a regenerating operating condition using a dual loop control architecture.

In accordance with one aspect of the invention, an adjustable frequency drive system includes an adjustable frequency drive coupleable to an AC load. The adjustable frequency drive includes a capacitor coupled to a DC link, an inverter having an input coupled to the DC link, and a current sensor system coupled to an output of the inverter. The adjustable frequency drive further includes a control system that is programmed to calculate an energy of the capacitor, generate a reference power using the calculated capacitor energy, and calculate a feedback power from realtime current signals received from the current sensor system. The control system is further programmed to compare the feedback power to the reference power, define a frequency offset based on the comparison, generate a speed command using the frequency offset, and output the speed command to the inverter.

In accordance with another aspect of the invention, a method of decelerating an induction machine includes controlling an adjustable speed drive to initially provide power to the induction machine according to a first operating point on a V/Hz profile, calculating a DC capacitor energy of the adjustable speed drive, and calculating a feedback power transmitted from the induction machine to the adjustable speed drive. The method also includes generating a compensation frequency based on the calculated DC capacitor energy and the calculated feedback power, defining a second operating point on the V/Hz profile from the compensation frequency, and controlling the adjustable speed drive to provide power to the induction machine according to the second operating point.

In accordance with yet another aspect of the invention, a control system for an adjustable speed drive coupled to a load includes a first control loop having a capacitor energy differential circuit and a first controller coupled to an output of the capacitor energy differential circuit. The first controller is programmed to regulate a capacitor energy variation. The control system also includes a second control loop coupled to an output of the first control loop, the second control loop having a power differential circuit and a second controller coupled to an output of the power differential circuit, the second controller programmed to regulate an active power consumption of the load.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENTS

The embodiments of the invention set forth herein relate to electronic power converters and inverters and to a system and method that provides for controlled deceleration of a load during a regenerating operating condition. The system includes a dual loop control system that includes an outer control loop that regulates capacitor energy and an inner control loop that regulates power consumed by the load.

Figure 1:
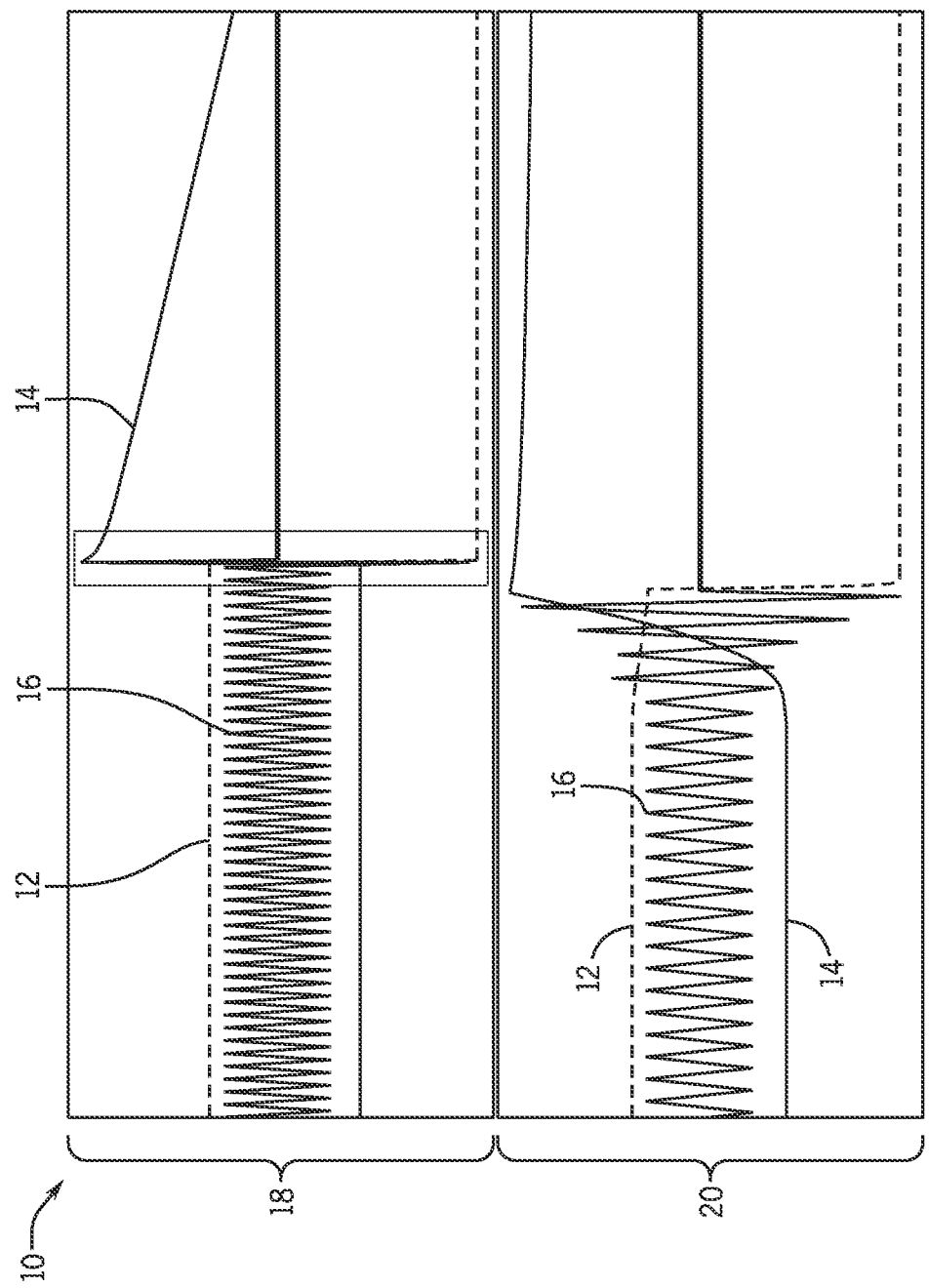
FIG. 1 is a graph illustrating waveforms for a 20 hp motor driven by a 40 hp drive from 100 Hz to 0 Hz at no load at a 0.1 second deceleration rate, according to a known technique.
Figure 2:
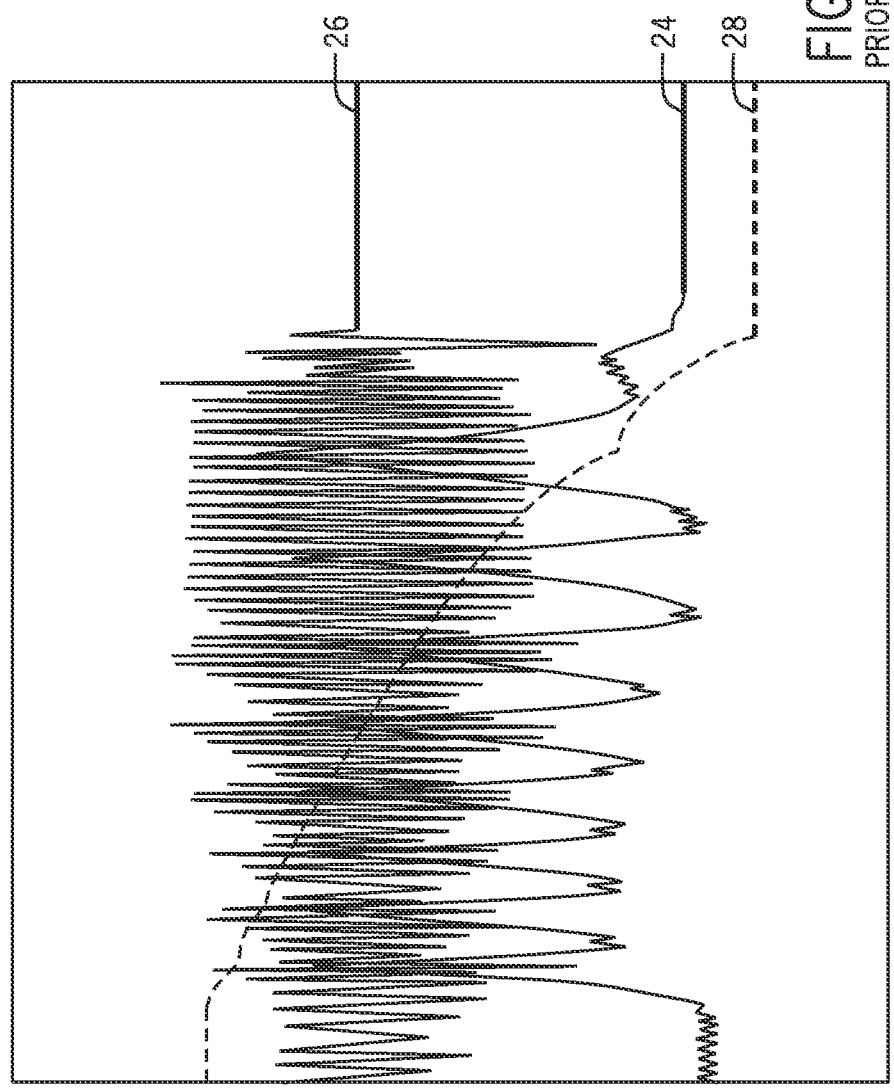
FIG. 2 is a graph illustrating waveforms for a 20 hp motor driven by a 60 hp drive from 100 Hz to 0 Hz at no load at a 0.1 second deceleration rate, according to another known technique.
Figure 3:
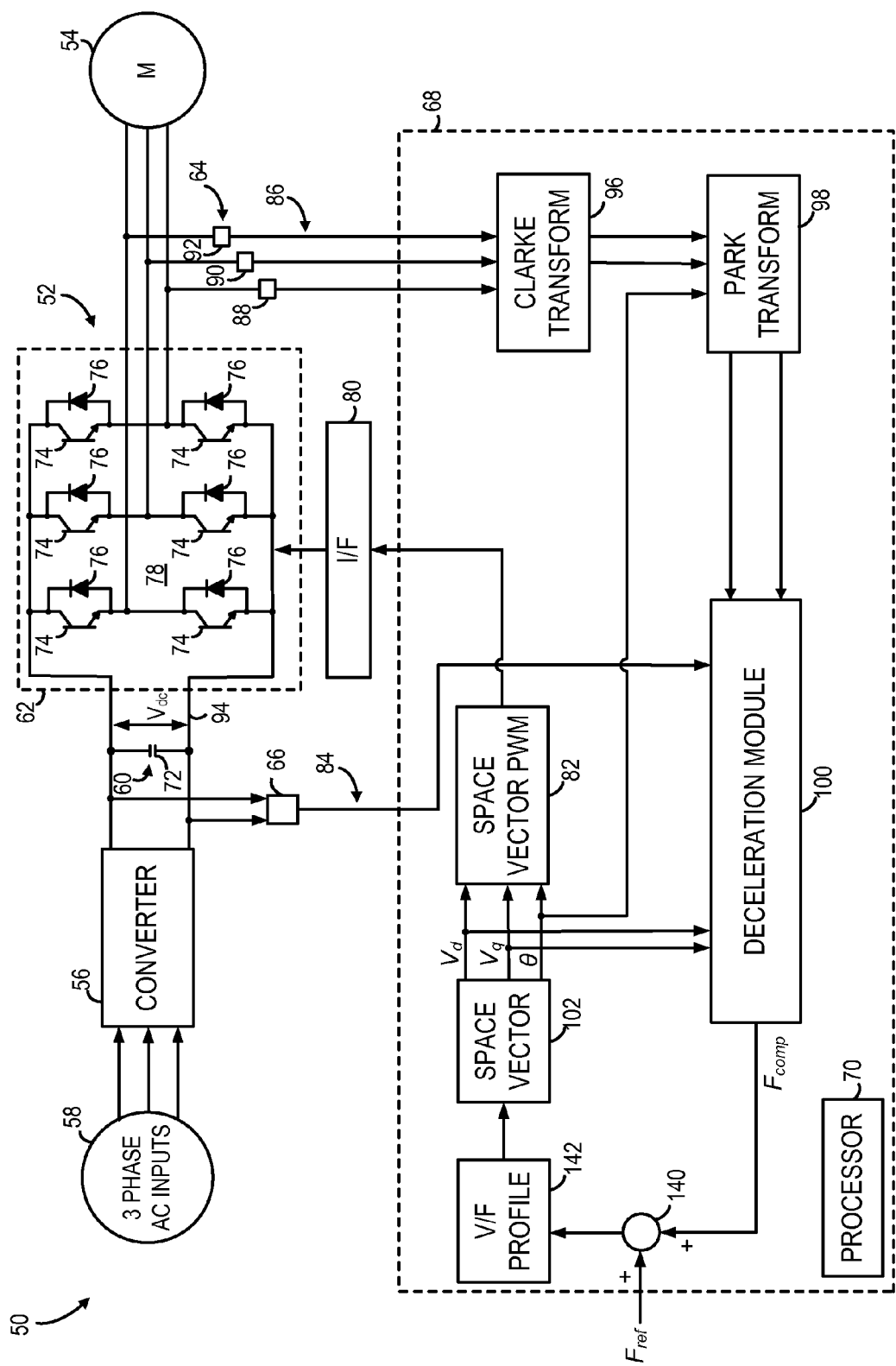
FIG. 3 is a schematic view of a 3-phase AC control system incorporating power conversion device, such as an adjustable speed drive (ASD), for controlling deceleration of a load in a controlled manner, according to an embodiment of the invention.

Referring to FIG. 3, a three-phase Adjustable Frequency Drive (AFD) system 50 is illustrated. AFD system 50 includes an Adjustable Frequency Drive (AFD) 52 designed to receive a three-phase alternating current (AC) power input, rectify the AC input, and perform a DC/AC conversion of the rectified segment into a three-phase alternating voltage of variable frequency and amplitude that is supplied to a load 54. In one embodiment, AFD 52 operates according to an exemplary V/Hz characteristic, described in more detail below. According to various embodiments, load 54 may be an AC motor, such as, for example, an induction machine. AFD 52 also includes a converter 56, such as a three-phase rectifier bridge that converts an uncontrolled AC input from an AC voltage input 58 to a direct current (DC) output, a DC link capacitor bank 60, a switch array 62 that converts a DC input to a controlled AC output, a current sensor system 64, a DC link voltage sensor 66, and a control system 68 including one or more computer processors 70 and a plurality of control algorithms.

Converter 56 converts three-phase an AC voltage input 58 to a DC power such that a DC link voltage, $V_{dc}$, is present between converter 56 and switch array 62. The DC link voltage is buffered or smoothed by DC link capacitor bank 60, which has an overall capacitance, $C_d$, based on one or multiple DC link capacitors 72.

Switch array 62 inverts and conditions the DC link voltage or DC link voltage to a controlled adjustable frequency, adjustable voltage AC output for the induction machine 54. According to one embodiment, switch array 62 includes a series of IGBT switches 74 and anti-parallel diodes 76 that collectively form a Pulse Width Modulation (PWM) inverter 78. PWM inverter 78 synthesizes AC voltage waveforms with a fixed frequency and amplitude for delivery to load 54, such as an induction motor. PWM inverter 78 is configured to operate according to a PWM control scheme, such as, for example, a Space Vector Modulation (SVM) control scheme or a Sinusoidal-Triangle PWM control scheme, to control the plurality of switches, thereby producing the controlled AC power output. In an exemplary embodiment, PWM inverter 78 is configured to operate according to a SVM control scheme. While the switch array 62 is shown as including insulated-gate bipolar transistors (IGBTs) 74 it is recognized that other embodiments of the invention contemplate other power switching devices as known in the art, such as metal-oxide-semiconductor field-effect transistors (MOSFETs), for example.

PWM inverter 78 is operated by control system 68, which may include a number of controllers or processors that perform high speed operations such as space-vector modulation (SVM), DC link voltage decoupling, and protection, for example. Control system 68 interfaces to PWM inverter 78 via gate drive signals and receives inputs from current sensor system 64 and DC link voltage sensor 66 to monitor changes in the DC link voltage as well as the output of PWM inverter 78. A suitable interface (I/F) 80 buffers the gate drive signals from the control system 68 to the IGBTs 74. In one embodiment, interface 80 receives low-power input signals from a space vector PWM module 82 in control system 68 and provides an amplified high-current drive input for the gate of its corresponding IGBT 74, so as to facilitate efficient switching thereof.

According to various embodiments, current sensor system 64 and DC link voltage sensor 66 may be wired or wireless sensors that transmit real-time voltage signals 84 and real-time current signals 86. Current sensor system 64 includes current sensors (e.g., Hall effect sensors) 88, 90, 92, which are placed on the AC outputs of AFD 52 in order to measure the three-phase AC motor currents. DC link voltage sensor 66 the DC link voltage, $V_{dc}$, on DC link 94. The monitored voltage changes and current values are used to control switching of PWM inverter 78 during a deceleration process, as described in detail below.

During operation, control system 68 receives real-time voltage and current signals 84, 86 and generates a series of control signals in space vector PWM module 82. According to one embodiment, control system 68 receives a frequency (or speed) command from an input device (not shown) in order to generate a frequency command and a voltage magnitude command. The voltage magnitude command is given by a function of the frequency command, typically referred to as a V/Hz curve or profile. In an exemplary embodiment, gate control signals are generated based on the V/Hz profile or curve. Space vector PWM module 82 outputs gate control signals to interface 80, thereby forming a SVM control scheme. The V/Hz profile may be, for example, a preset linear or non-linear curve that defines a relationship between an operating frequency and voltage for AFD 52.

In addition to space vector PWM module 82, control system 68 further includes a Clarke Transform module 96, a Park Transform module 98, a deceleration module 100, and a space vector module 102, which are executed by a suitable processor 70. Operation of space vector PWM module 82 and modules 96-102 are described in more detail with respect to FIGS. 4 and 5.

Figure 4:
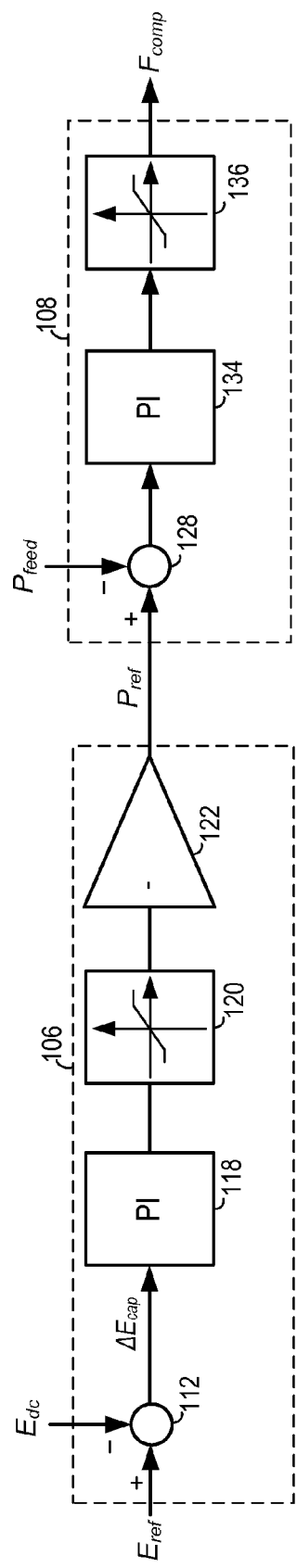
FIG. 4 is a block diagram of a dual loop control system for controlling the adjustable speed drive shown in FIG. 1 during deceleration, according to an embodiment of the invention.
Figure 5:
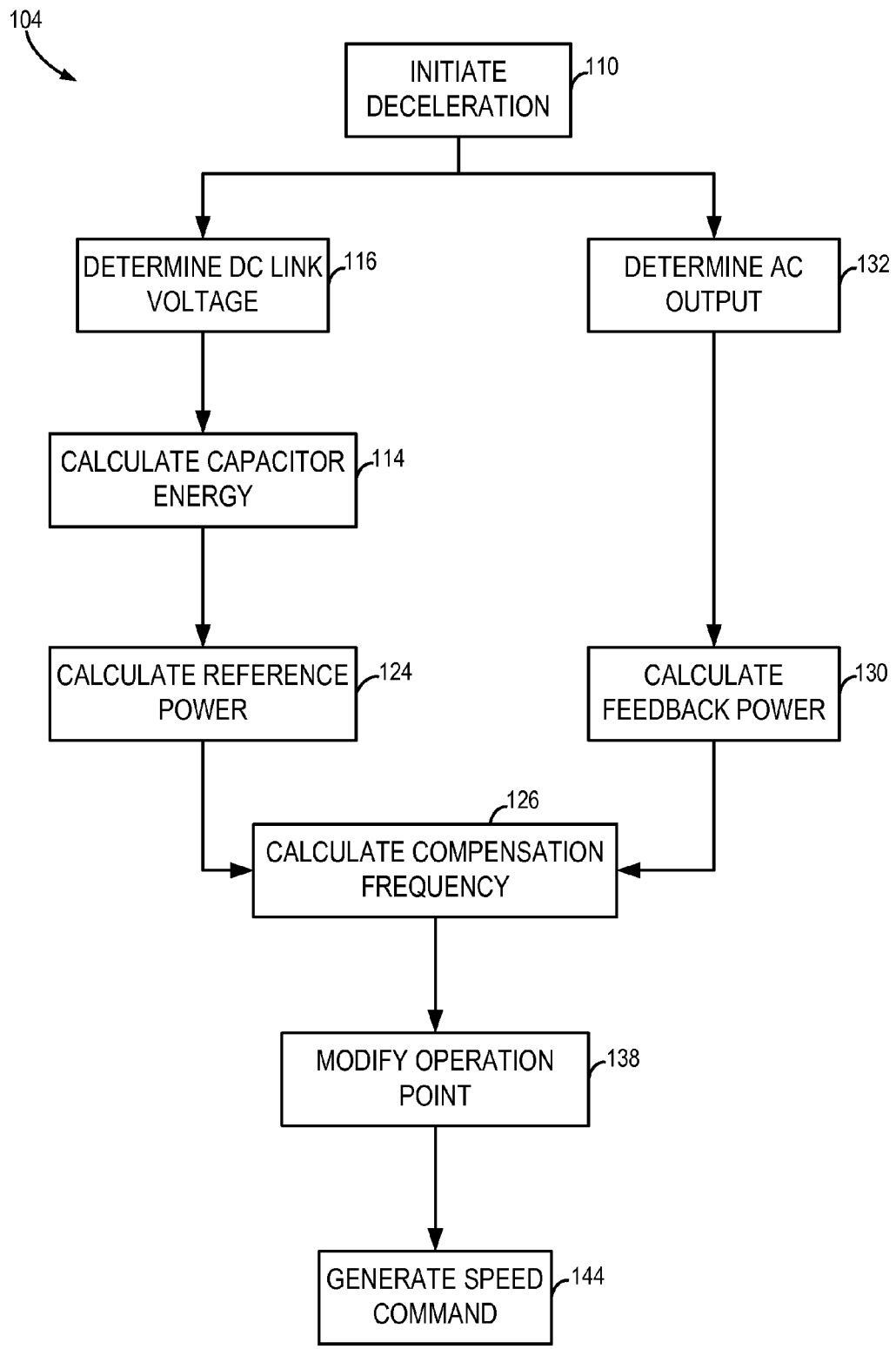
FIG. 5 is a flow chart setting forth the steps of a motor drive deceleration control technique in accordance with an embodiment of the invention.

Referring now to FIGS. 4 and 5, and with continued reference to the AFD system 50 of FIG. 3, a deceleration control technique 104 is set forth for smoothly decelerating a load. Technique 104 uses a dual control loop architecture to monitor the energy of DC link capacitor bank 60 and the output power of PWM inverter 78 and smoothly control the regenerating energy flow that develops as the induction machine 54 is decelerated and enters into the generating mode of operation. The dual control loop architecture includes an outer control loop 106 that regulates the energy variation of DC link capacitor bank 60 and an inner control loop 108 that regulates the active power consumed in induction machine 54.

Technique 104 begins at block 110 when AFD system 50 enters a deceleration control process for induction machine 54 and initiates operation of deceleration module 100, which includes inner control loop 108 and outer control loop 106 shown in FIG. 4. In one embodiment, technique 104 initiates operation of deceleration module 100 when a monitored DC link voltage rises above a predetermined voltage threshold.

Outer control loop 106 includes a capacitor energy differential circuit 112 that obtains a difference between capacitor energy, $E_{dc}$ of DC link capacitor bank 60 and a reference capacitor energy value, $E_{ref}$. The capacitor energy, $E_{dc}$, is calculated at block 114 according to:

$$E_{dc} = \frac{1}{2}CV_{dc}^2, \quad \text{(Eqn. 1)}$$

where C is the capacitance of DC link capacitor bank 60 and $V_{dc}$ is the realtime DC link voltage, which is determined at block 116. Differential circuit 112 compares the calculated realtime capacitor energy, $E_{dc}$, the reference capacitor energy value, $E_{ref}$ to determine the energy variation of DC link capacitor bank 60, $\Delta E_{cap}$. When $\Delta E_{cap}$ is greater than zero, the induction machine 54 feeds energy to DC link capacitor bank 60. When $\Delta E_{cap}$ is less than zero, the induction machine 54 absorbs energy from DC link capacitor bank 60.

In one embodiment, the reference capacitor energy value, $E_{ref}$ is calculated according to:

$$E_{ref} = \frac{1}{2}CV_{ref}^2, \quad \text{(Eqn. 2)}$$

where $V_{ref}$ is a DC link reference voltage. In an exemplary embodiment, the DC link reference voltage may be calculated according to:

$$V_{ref} = V_{in}*1.414+65 \quad \text{(Eqn. 3)},$$

where $V_{in}$ is an input utility voltage. In such an embodiment, the energy variation in the DC link capacitor may be defined as:

$$\Delta E_{cap} = \frac{1}{2}CV_{ref}^2 - \frac{1}{2}CV_{dc}^2. \quad \text{(Eqn. 4)}$$

A first controller 118 connected to differential circuit 112 operates a feedback control that regulates the outer control loop 106 such that $\Delta E_{cap}$ equals zero. In one embodiment, controller 118 is a proportional integral (PI) controller that conducts the feedback control. The output of controller 118 is received by a range limit block 120 and an amplifier 122, which outputs a reference power, $P_{ref}$, representing the active power of induction machine 54 at block 124.

The reference power, $P_{ref}$, is then used in the inner control loop 108 to calculate a compensation frequency, $F_{comp}$, at block 126. To calculate the compensation frequency, $F_{comp}$, a power differential circuit 128 compares the calculated reference power, $P_{ref}$, to a feedback power, $P_{feed}$, which is calculated at block 130. In one embodiment, the calculation of feedback power, $P_{feed}$, begins at block 132 by receiving current values from current sensor system 64 and performing a Clarke conversion of the current values in Clarke Transform module 96. The output of Clarke Transform module 96 is fed into Park Transform module 98 to perform a Park conversion. Deceleration module 100 uses the output from Park Transform module 98 and calculates the feedback power according to:

$$P_{feed} = \frac{3}{2}[V_d \quad V_q]\begin{bmatrix}I_d\\I_q\end{bmatrix}, \quad \text{(Eqn. 5)}$$

where $I_d$ and $I_q$ are the outputs from the Park conversion and $V_d$ and $V_q$ represent an internal reference voltage. When the feedback power, $P_{feed}$, is greater than zero, the induction machine 54 is absorbing energy from AFD 52. Alternatively, the induction machine 54 is feeding energy to AFD 52 when the feedback power, $P_{feed}$, is less than zero.

A second controller 134, such as, for example, a PI controller, receives the output from differential circuit 128 and operates a feedback control to regulate the active power consumed in induction machine 54. The output of controller

134 is first passed through range limit block 136, which outputs a frequency offset or calculated compensation frequency, $F_{comp}$. During a regenerating condition, the calculated compensation frequency, $F_{comp}$, is positive to limit the DC link voltage, $V_{dc}$, from increasing and keep it stable.

During a typical deceleration process, AFD 52 ramps the operating frequency at a predetermined rate while following a given V/F curve for the induction machine 54. Thus, every time point in the deceleration process has a given reference frequency, $F_{ref}$, assigned to it. Technique 104 deviates from the typical deceleration process by modifying the operating point of programmed deceleration process at block 138 by adding the calculated compensation frequency, $F_{comp}$, to the reference frequency, $F_{ref}$, using summation function 140. The output of the summation of $F_{comp}$ and $F_{ref}$ is then input to the V/F curve module 142, which generates a voltage command based on the modified frequency value at block 144. The calculated compensation frequency, $F_{comp}$, thus represents an additional amount of voltage to be added to induction machine 54 during deceleration.

The output of V/F curve module 142 is input to space vector module 102, which outputs the rotating voltage vector defined by $V_d$, $V_q$, and $\theta$. This rotating voltage vector is fed into the space vector PWM module 82, which, in turn, outputs gate signals representing a speed command to interface 80, which transmits the speed command to the IGBTs 74 of PWM inverter 78.

While PWM module 82 is described above as a space vector PWM module, one of ordinary skill in the art will recognize that other suitable PWMs, such as, for example, a Sinusoidal-Triangle PWM, may be employed. Further, controllers 118 and 134 may be proportional-integral-derivative (PID) controllers in alternative embodiments.

Figure 6:
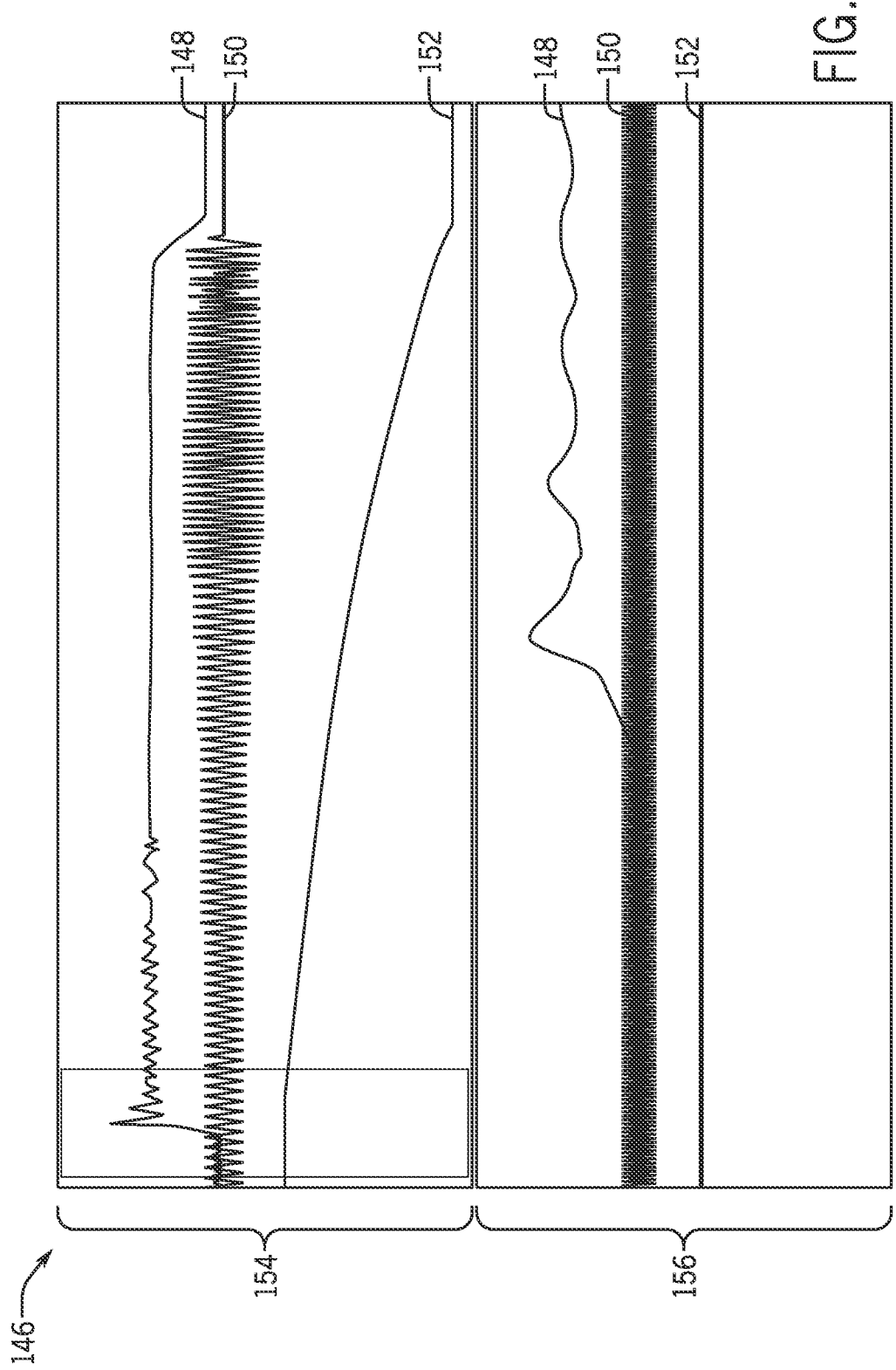
FIG. 6 is a graph illustrating waveforms of an exemplary ASD operating using the deceleration control technique of FIG. 5.

Referring now to FIG. 6, graph 146 illustrates the DC link voltage 148, output current 150, and output frequency 152 of an exemplary 20 hp induction machine driven by an exemplary 20 hp AFD drive controlled using technique 104 to decelerate the induction machine from 100 Hz to 0 Hz at no load in 0.1 seconds. A top portion 154 of graph 146 is illustrated in 2 second divisions, whereas a bottom portion 156 of graph 146 is illustrated in 200 ms divisions. As shown, DC link voltage 148 remains controlled over the deceleration while the output frequency or speed ramping 152 remains smooth. Further, the output current 150 is controlled and does not experience oscillation.

Beneficially, embodiments of the invention thus provide a system and method for controlling an adjustable frequency drive or variable speed drive to decelerate a load without the use of a breaking resistor using a control strategy that maintains a smooth DC link voltage during deceleration without tripping the drive or generating an oscillating condition in the DC link voltage. Embodiments of the decelerating control strategy set forth herein modify the frequency reference used to define the operating point of the drive in order to limit the DC link voltage at a given operating point during the generating mode of operation that develops during deceleration. The amount of modification to the frequency reference is determined based on a dual control loop strategy that controls capacitor energy and the active power consumed by the load.

A technical contribution for the disclosed method and apparatus is that it provides for a computer implemented technique for controlling deceleration of an AC load or induction machine. The technique employs the capabilities of a dual loop control system that includes a first control loop that regulates energy of the DC capacitor and a second control loop that regulates power consumed by the AC load.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not listed may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

Therefore, according to one embodiment of the present invention, an adjustable frequency drive system includes an adjustable frequency drive coupleable to an AC load. The adjustable frequency drive includes a capacitor coupled to a DC link, an inverter having an input coupled to the DC link, and a current sensor system coupled to an output of the inverter. The adjustable frequency drive further includes a control system that is programmed to calculate an energy of the capacitor, generate a reference power using the calculated capacitor energy, and calculate a feedback power from realtime current signals received from the current sensor system. The control system is further programmed to compare the feedback power to the reference power, define a frequency offset based on the comparison, generate a speed command using the frequency offset, and output the speed command to the inverter.

According to another embodiment of present invention, a method of decelerating an induction machine includes controlling an adjustable speed drive to initially provide power to the induction machine according to a first operating point on a V/Hz profile, calculating a DC capacitor energy of the adjustable speed drive, and calculating a feedback power transmitted from the induction machine to the adjustable speed drive. The method also includes generating a compensation frequency based on the calculated DC capacitor energy and the calculated feedback power, defining a second operating point on the V/Hz profile from the compensation frequency, and controlling the adjustable speed drive to provide power to the induction machine according to the second operating point.

According to yet another embodiment of the present invention, a control system for an adjustable speed drive coupled to a load includes a first control loop having a capacitor energy differential circuit and a first controller coupled to an output of the capacitor energy differential circuit. The first controller is programmed to regulate a capacitor energy variation. The control system also includes a second control loop coupled to an output of the first control loop, the second control loop having a power differential circuit and a second controller coupled to an output of the power differential circuit, the second controller programmed to regulate an active power consumption of the load.

The present invention has been described in terms of the preferred embodiment, and it is recognized that equivalents, alternatives, and modifications, aside from those expressly stated, are possible and within the scope of the appending claims.

What is claimed is:

1. An adjustable frequency drive comprising:
   a converter including an input coupleable to an AC source;
   a DC link coupled to an output of the converter, the DC link having at least one DC link capacitor thereon;
   an inverter comprising an input coupled to the DC link and an output coupleable to a load; and
   a control system operable to drive the inverter, the control system programmed to:
      monitor operating characteristics of the adjustable frequency drive;
      identify when the adjustable frequency drive is in a regenerative operation mode based on the monitored operating characteristics;
      after identifying the adjustable frequency drive is in the regenerative operation mode, drive the inverter according to an operating point on a voltage/frequency profile, the operating point comprising a voltage and a reference frequency;
      modify the operating point on the voltage/frequency profile by:
         adding a compensation frequency to the reference frequency; and
         increasing the operating point voltage; and
      drive the inverter according to the modified operating point on the voltage/frequency profile.

2. The adjustable frequency drive of claim 1 wherein the control system is further programmed to:
   monitor a voltage of the DC link;
   compare the voltage of the DC link to a DC link threshold voltage; and
   identify that the adjustable frequency drive is in the regenerative operation mode when the voltage of the DC link is greater than the DC link threshold voltage.

3. The adjustable frequency drive of claim 1 wherein the control system is further programmed to calculate the compensation frequency by:
   calculating an energy in the at least one DC link capacitor;
   comparing the energy in the at least one DC link capacitor to a reference capacitor energy;
   calculating a reference power based on the comparison of the energy in the at least one DC link capacitor and the reference capacitor energy;
   comparing the reference power to a feedback power; and
   calculating the compensation frequency based on the comparison of the reference power to the feedback power.

4. The adjustable frequency drive of claim 3 wherein the control system is further programmed to regulate the energy in the at least one DC link capacitor such that the energy in the at least one DC link capacitor is equal to the reference capacitor energy.

5. The adjustable frequency drive of claim 3 wherein the reference capacitor energy is based on a DC link reference voltage.

6. The adjustable frequency drive of claim 1 wherein the control system is further programmed to increase the operating point voltage by inputting the modified reference frequency into the voltage/frequency profile.

7. The adjustable frequency drive of claim 1 wherein the control system is further programmed to drive the inverter using a space vector pulse width modulation control scheme.

8. A control system for an adjustable frequency drive, the control system comprising a processor programmed to:
   monitor operating characteristics of the adjustable frequency drive;
   identify a generating mode of operation in the adjustable frequency drive based on the monitored operating characteristics of the adjustable frequency drive;
   after identifying the generating mode of operation, identify an operating point on a voltage/frequency profile of the adjustable frequency drive, the operating point comprising a reference frequency;
   modify the operating point of the adjustable frequency drive by adding a compensation frequency to the reference frequency; and
   control the adjustable frequency drive to increase the voltage output from an inverter in the adjustable frequency drive to a voltage output corresponding to the modified operating point.

9. The control system of claim 8 wherein the processor is further programmed to calculate the compensation frequency by:
   calculating an energy in a DC link capacitor bank of a DC link of the adjustable frequency drive, the DC link capacitor bank comprising including at least one DC link capacitor;
   comparing an energy of the DC link capacitor bank with a reference DC link capacitor bank energy;
   calculating a reference power based on the comparison of the energy of the DC link capacitor bank energy and the reference DC link capacitor bank energy;
   calculating a feedback power; and
   calculating the compensation frequency based on a comparison of the reference power and the feedback power.

10. The control system of claim 9 wherein the processor is further programmed to calculate the feedback power by:
    measuring a load current;
    performing a Clarke transform on the measured load current;
    performing a Park transform on the Clarke transform of the measured load current; and
    calculating the feedback power based on at least the Park transform of the measured load current.

11. The control system of claim 8 wherein the processor is further programmed to control the adjustable frequency drive to increase the voltage output from the inverter in the adjustable frequency drive to the voltage output corresponding to the modified operating point by inputting the modified operation point frequency into a voltage/frequency profile.

12. The control system of claim 8 wherein the processor is programmed to monitor operating characteristics of the adjustable frequency drive by monitoring a DC link voltage.

13. The control system of claim 12 wherein the processor is programmed to identify the generating mode of operation when the DC link voltage rises above a reference DC link voltage.

14. The control system of claim 8 wherein the processor is programmed to control the adjustable frequency drive to operate at the modified operating point using a space vector pulse width modulation control scheme.

15. A method for decelerating a load coupled to an adjustable frequency drive, the method comprising:
    monitoring a DC link voltage of a DC link of the adjustable frequency drive;
    identifying when the adjustable frequency drive is in a regenerative operation mode based on the monitored DC link voltage;
    after identifying the adjustable frequency drive is in the regenerative operation mode, driving an inverter in the adjustable frequency drive according to an operating point on a voltage/frequency profile, the operating point comprising a voltage and a reference frequency;
    modifying the operating point on the voltage/frequency profile during the regenerative operating mode by:
        increasing the reference frequency by adding a compensation frequency to the reference frequency; and
        increasing the voltage of the operating point; and
    operating the inverter according to the modified operating point.

16. The method of claim 15 further comprising calculating the compensation frequency by:
    calculating an energy in a DC link capacitor bank of the DC link, the DC link capacitor bank comprising including at least one DC link capacitor;
    comparing an energy of the DC link capacitor bank with a reference DC link capacitor bank energy;
    calculating a reference power based on the comparison of the energy of the DC link capacitor bank energy and the reference DC link capacitor bank energy;
    calculating a feedback power; and
    calculating the compensation frequency based on a comparison of the reference power and the feedback power.

17. The method of claim 16 further comprising calculating the feedback power by:
    measuring a load current;
    performing a Clarke transform on the measured load current;
    performing a Park transform on the Clarke transform of the measured load current; and
    calculating the feedback power based on at least the Park transform of the measured load current.

18. The method of claim 16 further comprising calculating the energy of the DC link capacitor bank based on a measured DC link voltage.

19. The method of claim 16 further comprising calculating the energy of the reference DC link capacitor bank based on a reference DC link voltage.

20. The method of claim 15 wherein increasing the voltage of the operating point comprises inputting the increased reference frequency into a voltage/frequency profile.

* * * * *